(12) United States Patent
Harris (10) Patent No.: US 7,457,093 B2
(45) Date of Patent: Nov. 25, 2008

(54) PROTECTION AND INDICATION APPARATUS

(75) Inventor: Richard Harris, Palo Alto, CA (US)

(73) Assignee: FulTec Semiconductor, Inc., Mountain View, CA (US)

( * ) Notice: Subject to any disclaimer, the term of this patent is extended or adjusted under 35 U.S.C. 154(b) by 300 days.

(21) Appl. No.: 11/028,277

(22) Filed: Jan. 3, 2005

(65) Prior Publication Data

US 2005/0180080 A1     Aug. 18, 2005

Related U.S. Application Data

(63) Continuation of application No. PCT/AU03/00848, filed on Jul. 2, 2003.

(30) Foreign Application Priority Data

Jul. 2, 2002    (AU) .................................. PS3333

(51) Int. Cl.
    *H02H 3/22* (2006.01)
(52) U.S. Cl. .................................................. 361/111
(58) Field of Classification Search .................. 361/111
    See application file for complete search history.

(56) References Cited

U.S. PATENT DOCUMENTS

| | | | | |
|---|---|---|---|---|
| 4,068,277 A * | 1/1978 | Simokat | ....................... | 361/55 |
| 4,104,581 A * | 8/1978 | Arkosy | ....................... | 324/523 |
| 4,533,970 A | 8/1985 | Brown | ....................... | 361/58 |
| 4,807,081 A * | 2/1989 | Crofts et al. | ....................... | 361/56 |
| 5,101,180 A * | 3/1992 | Frey | ....................... | 333/12 |
| 5,321,574 A * | 6/1994 | Patrick et al. | ....................... | 361/99 |
| 5,535,087 A * | 7/1996 | Puckett et al. | ....................... | 361/118 |
| 5,625,519 A | 4/1997 | Atkins | | |
| 5,757,603 A * | 5/1998 | Kapp et al. | ....................... | 361/118 |
| 6,157,529 A | 12/2000 | Ahuja | | |
| 6,266,223 B1 | 7/2001 | Curry | | |
| 6,542,347 B1 * | 4/2003 | Young | ....................... | 361/115 |
| 6,683,770 B1 * | 1/2004 | Marsh | ....................... | 361/111 |
| 7,023,680 B1 * | 4/2006 | Johnson et al. | ....................... | 361/111 |
| 2003/0151862 A1 * | 8/2003 | Kouwenhoven et al. | ....... | 361/35 |

FOREIGN PATENT DOCUMENTS

| | | |
|---|---|---|
| AU | 94/00358 | 1/1995 |
| BE | 1009569 | 5/1997 |

(Continued)

*Primary Examiner*—Michael J Sherry
*Assistant Examiner*—Ann T Hoang
(74) *Attorney, Agent, or Firm*—Lumen Patent Firm (57) ABSTRACT

A protection apparatus (48) is provided which in addition to protecting electronic equipment (5) from overvoltage transients is also able to provide an indication of whether or not said transients are due to impedances associated with poor earthing. In one embodiment the protection apparatus (48) includes an input terminal (42), an output terminal (60) and a ground reference terminal (62) with a transient blocking unit (50) arranged to isolate the output terminal (60) in response to the destructive transient voltages. A gas discharge tube (46) is provided to conduct transient currents associated with the destructive transient voltages to the earth reference connection point (62); and an indicator (58), such as a fuse or circuit breaker is placed in series with the transient blocking unit (50) to indicate the presence of a voltage resulting from an interaction of the transient currents with an earthing impedance.

15 Claims, 7 Drawing Sheets

FOREIGN PATENT DOCUMENTS

| | | |
|---|---|---|
| DE | 300256 A5 | 5/1992 |
| DE | 4402461 | 8/1995 |
| EP | 818867 | 7/1997 |
| EP | 862255 | 11/1998 |
| JP | 365020 | 3/1991 |
| JP | 2002-176347 | 6/2002 |
| WO | WO 92/09129 * | 5/1992 |

* cited by examiner

PROTECTION AND INDICATION APPARATUS

CROSS-REFERENCE TO RELATED APPLICATIONS

This application is a continuation of international application PCT/AU03/00848 filed on Jul. 2, 2003. International application PCT/AU03/00848 claims the benefit of Australian application PS 3333 filed Jul. 2, 2002.

FIELD OF THE INVENTION

This invention relates to a protection and indication apparatus. The apparatus provides an indication, preferably a visual indication, of the occurrence of a particular fault condition.

BACKGROUND TO THE INVENTION

The invention will be described by way of example in the context of protecting equipment from potentially harmful transients, such as those caused by lightning strikes. It should be appreciated that this description with reference to protection from lightning produced transients is by way of example only and that embodiments of the invention may be used for purposes other than this specific application.

Figure 1:
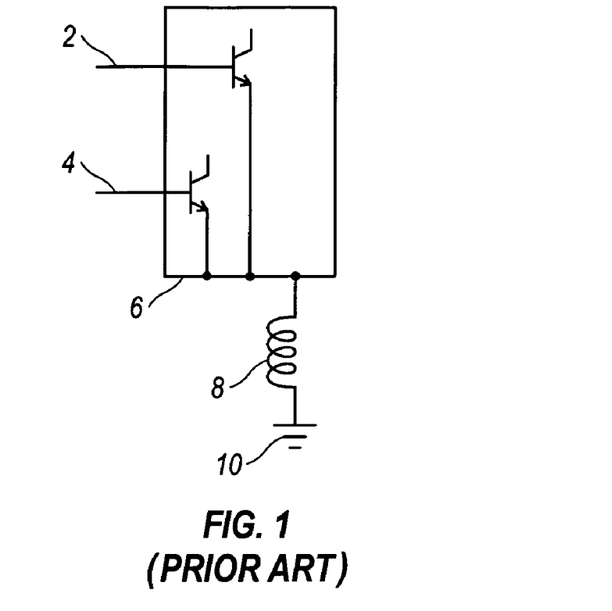
FIG. 1 is a schematic diagram of electrical equipment that requires protection from electrical transients.

FIG. 1 depicts an item of electronic equipment 6, for example a telephone switch or a radio transceiver, which is susceptible to damage from over-voltage transients on lines 2 and 4. Equipment 6 is earthed at point 10 by means of an earthing network that will usually have an associated earthing impedance 8. Impedance 8 is typically inductive but might also be resistive or capacitive in nature.

It is common practice to protect equipment 6 by means of a protective module which is inserted in series between lines 2 and 4 and equipment 6. Such modules typically include high voltage breakdown components such as gas discharge tubes (GDTs) and metal oxide varistors (MOVs) for connection between the lines and ground. In the event of a lightning strike or other transient occurring on lines 2 and 4 then the protective module shunts the transient to ground thereby protecting the equipment. However a problem is associated with such prior art modules as will now be described with reference to a typical prior art protection module 24, shown in FIG. 2.

Figure 2:
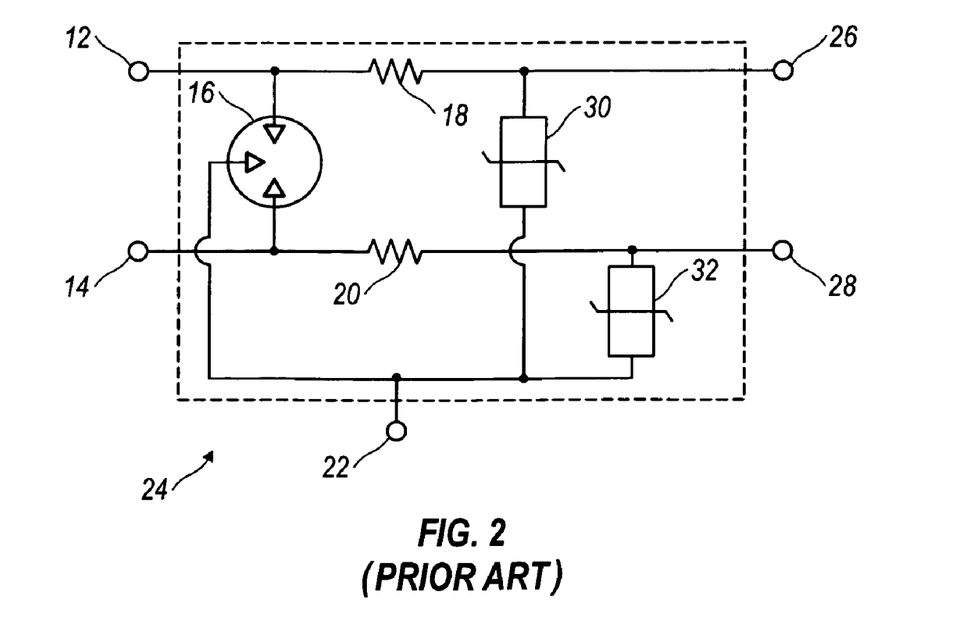
FIG. 2 is a circuit diagram of a prior art protective module for protecting electrical equipment.
Figure 3:
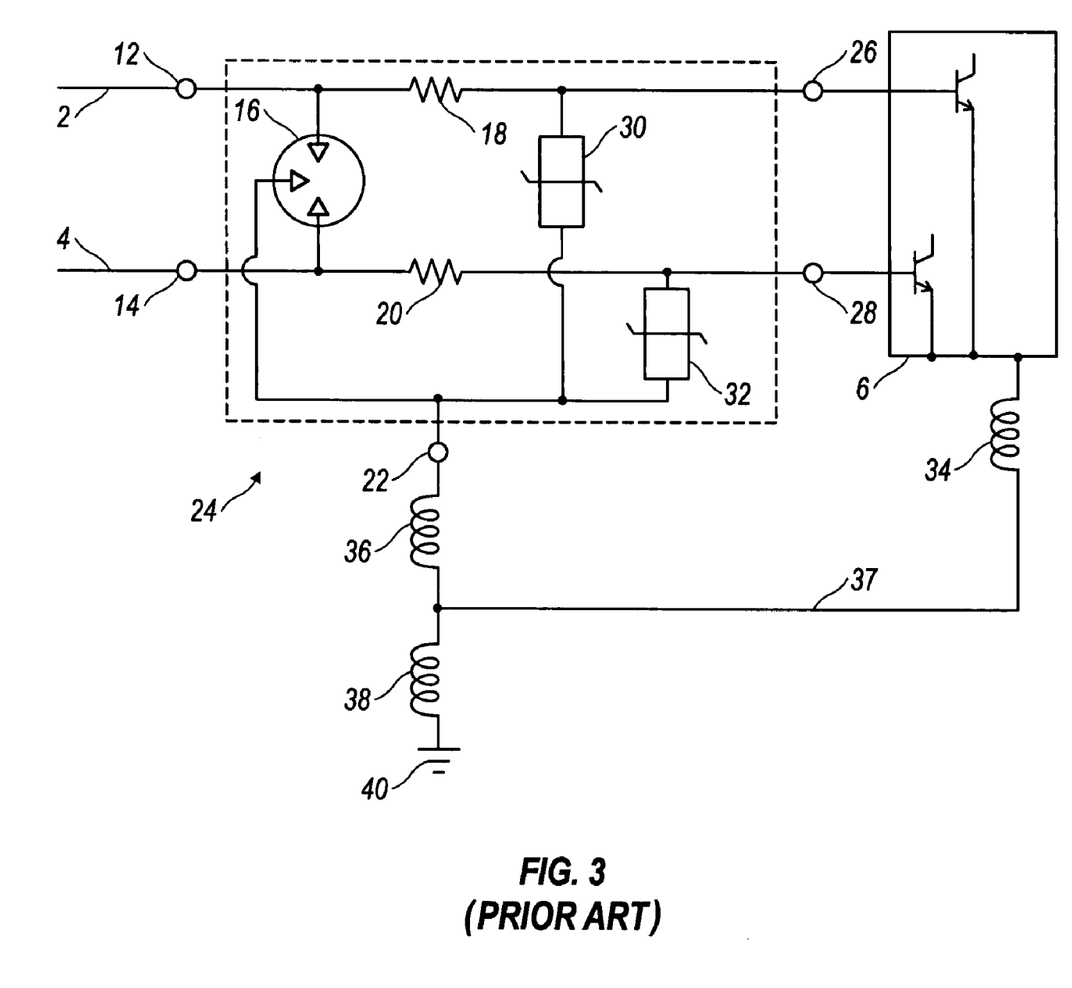
FIG. 3 is a schematic diagram of the prior art protective module of FIG. 2 in use.

With reference to FIG. 2, protection module 24 includes first and second input terminals 12 and 14 and first and second output terminals 26 and 28 for connecting the module in series between lines 2 and 4 and equipment 6 as shown in FIG. 3. Protection modules configured to protect only a single line, or more than two lines are also available. Internally, protection module 24 includes a first limiting resistor 18 connected between first input terminal 12 and first output terminal 26. A MOV 30 is connected between first output terminal 26 and a protection earth reference terminal 22. Similarly, a further limiting resistor 20 is connected between second input terminal 14 and second output terminal 28. A second MOV 32 is connected between second output terminal 28 and protection earth terminal reference 22. Finally, a gas arrestor in the form of gas discharge tube (GDT) 16 is connected from first and second input terminals 12 and 14 to ground reference terminal 22.

FIG. 3 shows protection module 24 in use wherein protection module 24 and equipment 6 are bound to an equipotential earth 37 by connections that exhibit certain levels of earthing impedance which may be a combination of resistance, capacitance and inductance. For purposes of explanation the earthing impedances are represented by inductors 36 and 34. As previously mentioned, where protection module 24 and equipment 6 are not adequately or correctly bound to the system earth potential, earthing impedances 36 and 34 may be substantial.

Equipotential earth 37 is connected to a true or real earth 40 by an earthing conductor that exhibits an impedance represented by inductor 38.

Where the earthing connections are good, so that impedance 36 is negligible, then in the event of a transient occurring on lines 2 and/or 4, GDT 16 and MOVs 30 and 32 provide a measure of protection for equipment 6. However, if the earth connections are not good, or the cables used to provide these connections are relatively long, then impedance 36 is likely be significant. In that case should transient over-voltages occur on lines 2 and 4 then protective module 24 will react by shunting the associated current to ground via MOVs 30 and 32 and GDT 16. However as current commences to be shunted to ground impedance 36 will cause a rise in the protection earth reference voltage at terminal 22. In conventional protection systems, such as that provided by module 24, the rise in the protection earth reference voltage is unavoidably reflected through terminals 26 and 28 onto terminating equipment 6. Consequently a transient current flows through equipment 6 which may cause damage.

It will be realised that in the prior art circuit of FIG. 2, the point at which the internal shunt components, MOVs 30 and 32 and GDT 16, commence operation is dependent on the voltages on lines 2 and 4 relative to the protection earth reference voltage at terminal 22. If the protection earth reference rises in voltage, for whatever reason including the one identified above, then that rise will be reflected on to terminating equipment 6. That is, if a transient on lines 2 and 4 results in damage to equipment 6 then all that may be discerned is that the equipment has not been adequately protected. There is no way of knowing if the failure to protect the equipment was due to poor earthing, the inadequacy of the shunt components within module 24 or because the surge or transient was applied directly to equipment 6 and bypassed protection module 24.

From the above discussion it will be understood that there is a problem with prior art protective apparatus of the type typified by the module of FIG. 2. Namely, protective modules of the type of FIG. 2 do not provide adequate protection in the case of a rise in the protection earth reference voltage. A further problem is that when such a rise occurs and a transient causes damage to the terminating equipment, considerable investigative effort is then required to determine the cause of the damage.

It is an object of the present invention to provide a protection apparatus that addresses one or more of the problems referred to above.

SUMMARY OF THE INVENTION

According to a first aspect of the present invention there is provided a protection apparatus including at least one protection circuit, the protection circuit including an input connection point, an output connection point and an earth reference connection point for protecting electronic equipment connectable to the output point from destructive transient voltages at the input point, said circuit further including:

an isolator arranged to isolate the output connection point in response to the destructive transient voltages;

a surge arrestor arranged to conduct transient currents associated with the destructive transient voltages to the earth reference connection point; and an indicator arranged to indicate the presence of a voltage resulting from an interaction of the transient currents with an earthing impedance.

Preferably the isolator comprises a series protection device connected between the input connection point and the output connection point.

The series protection device may comprise a transient blocking unit (TBU).

In a preferred embodiment the surge arrestor is connected to a node in common with the input connection point and a side of the series protection device.

The indicator may include a fuse or circuit breaker.

Preferably the indicator further includes a number of series connected high voltage breakdown devices in parallel with the series protection device.

The high voltage breakdown devices may comprise metal oxide varistors (MOVs).

In a preferred embodiment the fuse is connected in parallel across at least one of the series connected MOVs.

Preferably the surge arrestor comprises a gas discharge tube.

According to a further aspect of the present invention there is provided a protection apparatus including at least one protection circuit, said protection circuit including an input connection point, an output connection point and an earth reference connection point for protecting electronic equipment connectable to the output connection point from destructive transient voltages at the input connection point, said circuit further including:
    an isolation means for isolating the output connection point from the destructive transient voltages at the input connection point;
    a transient conduction means for conducting transient currents associated with the destructive transient voltages to the earth reference connection point; and
    an indicator means for indicating the presence of a voltage resulting from an interaction of the transient currents with an earthing impedance.

The isolation means may comprise a series protection means such as a transient blocking unit (TBU).

In a preferred embodiment the transient conduction means will comprise a gas arrestor such as a gas discharge tube (GDT).

The indicator means may comprise a fuse or a circuit breaker.

According to a final aspect of the present invention there is provided a method of protecting electrical equipment from destructive transient voltages, the method including the steps of:
    isolating the equipment from the destructive transient voltages;
    diverting transient currents associated with the destructive transient voltages to an earthing network;
    indicating the presence of a voltage resulting from interaction of the transient currents with an impedance of the earthing network.

Further preferred features of the various aspects of the invention will be apparent from the following description of preferred embodiments which will be made with reference to a number of figures.

DETAILED DESCRIPTION OF PREFERRED EMBODIMENT

Figure 4:
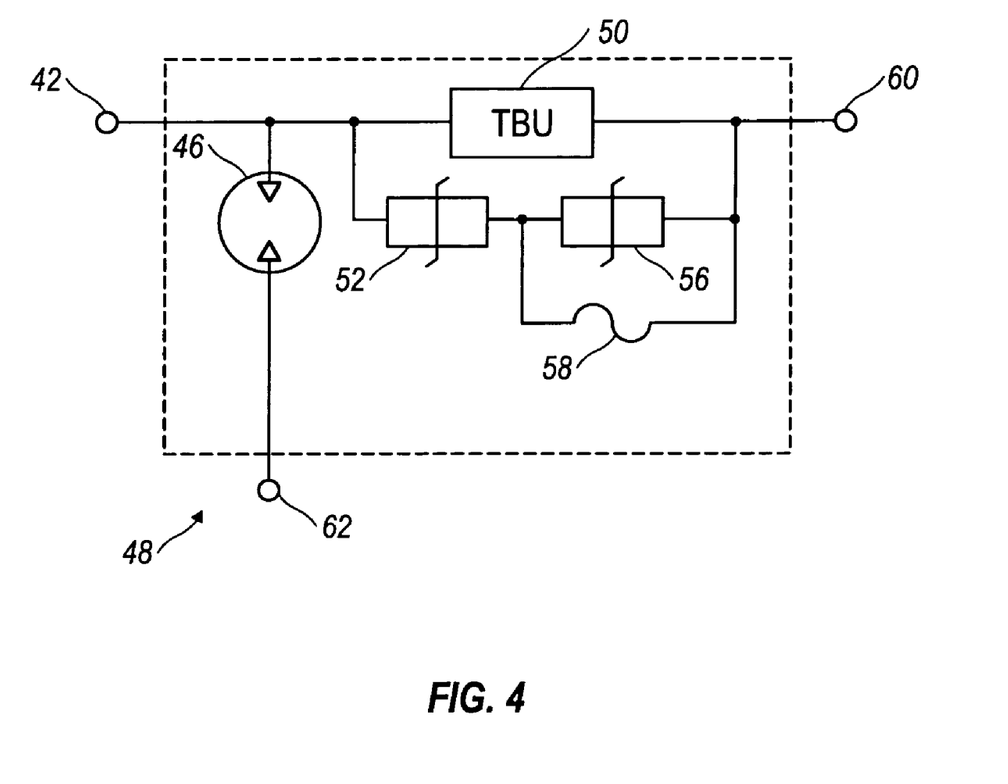
FIG. 4 is a schematic diagram of a protection and indication module according to a preferred embodiment of the present invention.

FIG. 4 is a circuit diagram of a protection apparatus 48 according to a preferred embodiment of the present invention. Module 48 is configured to protect a single line however it is straightforward to adapt the invention to provide a protection and indication module to protect more than one line as will be discussed later. Module 48 includes an isolation means in the form of a series protection device being a transient blocking unit (TBU) 50. TBU 50 is connected between an input connection point, in the form of terminal 42, and an output connection point in the form of terminal 60.

A TBU is a device configured to open-circuit once the current through it reaches a certain predetermined trigger level. In the event that the voltage across the TBU subsequently continues to rise then eventually a breakdown voltage will be reached at which the TBU conducts again. Suitable TBU's may be purchased from Fultec Pty Ltd of, 101 Hyde Rd, Yeronga, Brisbane QLD 4104, Australia. Circuits for implementing suitable TBUs are described in granted U.S. Pat. No. 5,742,463 and in international patent application No. PCT/AU03/00175, both by the present inventor. The descriptions of both U.S. Pat. No. 5,742,463 and PCT/AU03/00175 are hereby both incorporated in their entireties by cross-reference.

Connected in parallel with TBU 50 is an indicator circuit including two series connected MOVs 52 and 56. MOV 52 is selected to commence operation at a significant fraction of the breakdown voltage (or maximum blocking voltage) of TBU 50. In the presently described embodiment MOV 52 is selected to commence operation at 94% of the breakdown voltage of TBU 50. In contrast MOV 56 is selected to commence operation at a small fraction of the breakdown voltage of TBU 50. The operating points of the MOVs are preferably selected so that in use the bypass effect of the MOVs in parallel with the TBU changes only a small amount before and after the indicator fuse blows.

In the presently described embodiment MOV 56 is selected to commence operation at approximately 5% of the breakdown voltage of TBU 50. The sum of the breakdown voltages of MOV 52 and MOV 56 is selected to be less than the breakdown voltage of TBU 50. An indicator in the form of fuse 58 is connected in parallel with MOV 56. A surge arrestor in the form of GDT 46 is placed to conduct overvoltage transients from terminal 42 to an earth reference connection point in the form of terminal 62.

TBU 50 operates to block current surges associated with overvoltages on terminal 42 irrespective of whether the current surge is directly generated by a voltage surge across protective module 48, or subsequently generated due to poor earth connections or other causes.

Figure 5:
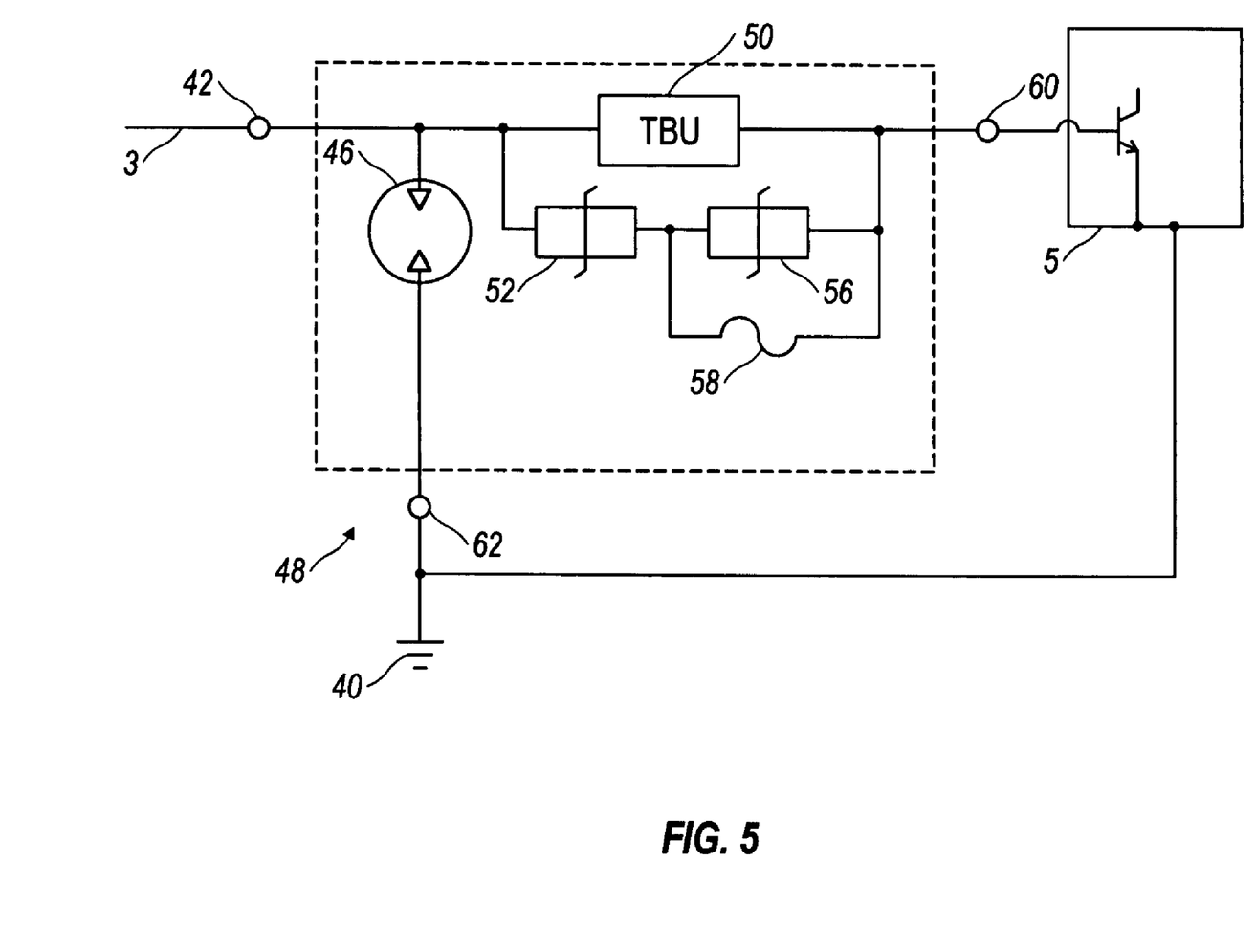
FIG. 5 is a schematic diagram of the protection and indication module of FIG. 4 in use in a situation where good earthing is provided.

Referring now to FIG. 5, protective module 48 is shown connected to protect equipment 5 in a case where both the protective module and equipment 5 are well grounded with negligible earthing impedances. In the event of a transient overvoltage occurring on line 3 and hence terminal 42 then the current through TBU 50 will attain the TBU's trigger value thereby causing the TBU to trip to open circuit. Open circuiting TBU 50 prevents any further transient current flowing into terminating equipment 5 and also causes the voltage at input terminal 42 to accelerate its rise until it causes GDT 46 to fire. Upon GDT 46 firing it shorts line 3 to ground via terminal 62 thereby diverting the transient safely to ground and protecting equipment 6. Once the transient has passed GDT 46 and TBU 50 relax back to their normal states.

Figure 6:
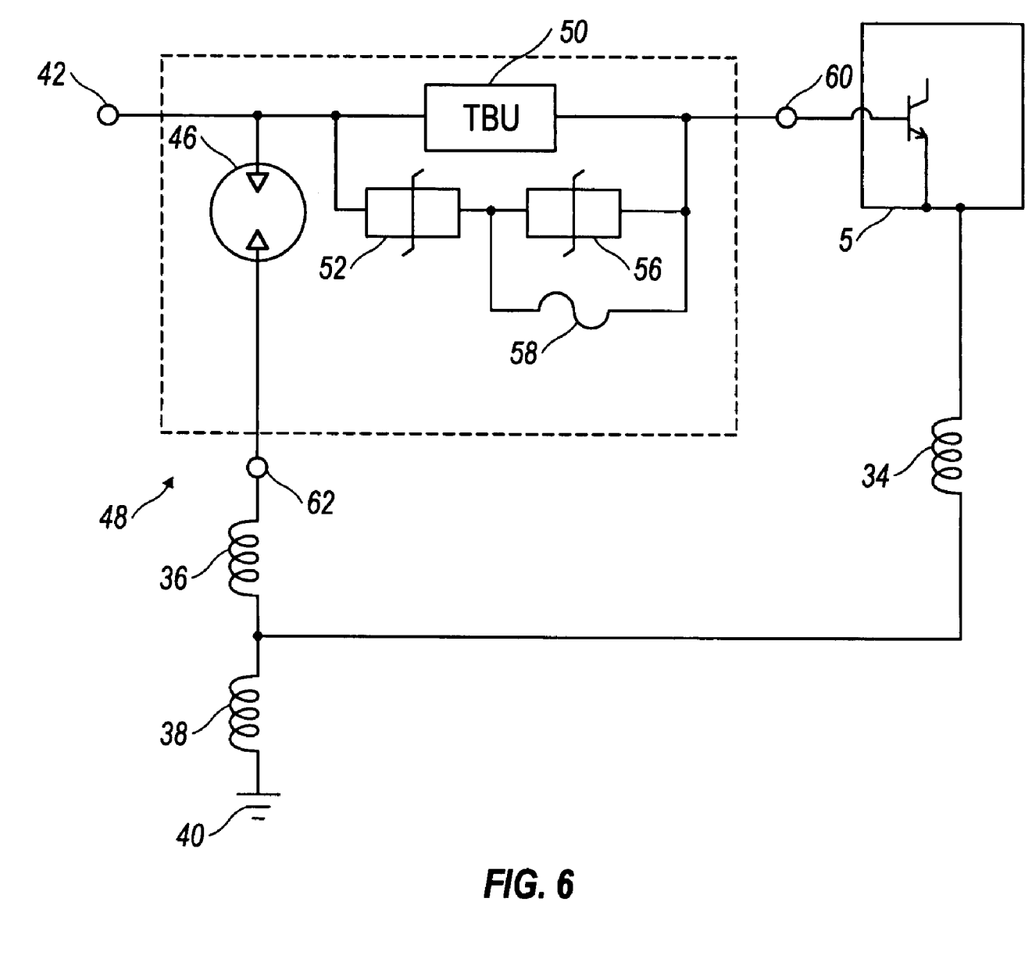
FIG. 6 is a schematic diagram of the protection and indication module of FIG. 4 in use in a situation where poor earthing is provided.

In contrast to FIG. 5, FIG. 6 shows protective module 48 connected to protect equipment 6 in a case where there are non-negligible earthing impedances represented by inductances 34, 36 and 38. As was the case with reference to FIG. 5, in the event of a transient overvoltage occurring at terminal 42 then the current through TBU 50 will reach the TBU's trigger value so that it will trip to open circuit. Open-circuiting TBU 50 prevents any further transient current flowing into terminating equipment 5 and therefore the voltage at terminal 60 falls to practically zero. The open circuiting of the TBUs also causes the voltage at input terminal 42 to accelerate its rise until it causes GDT 46 to fire. However, once the GDT fires and transient current begins to sink to ground, the earthing impedance interacts with it to generate a voltage at terminal 62 and therefore at the input terminal side of TBU 50. If the earthing impedance is large this voltage can approach the breakdown voltage of the TBU. Once this happens the MOV devices across TBU 50 begin to conduct and again pass some current through output terminal 60 into terminating equipment 6. Initially the 94% MOV 52 conducts until sufficient current flows to blow fuse 58. Once the fuse has blown then 5% MOV 56 becomes conductive. The bypass of current through the MOVs due to the poor earthing, is permanently recorded by the blown indicator fuse 58. Whether or not damage is subsequently caused to the terminating equipment, the state of fuse 58 can be used by system maintainers to diagnose that the failure to protect equipment 6 was due to poor protection earth grounding.

It can be seen from the above description of the protection module in use that its operation iterates a method that includes a sequence of steps as follows. Initially equipment 6 is isolated from destructive transient voltages at input terminal 42 by means of TBU 50. Open-circuiting of TBU 50 then hastens the diversion of transient currents associated with the destructive transient voltages to an earthing network having associated impedances 36 and 38.

Finally, the presence of a substantial voltage resulting from interaction of the transient currents with the associated impedances due to poor earthing is indicated by the blowing of fuse 58.

It will be realised that a limiting factor to the operation of protective module 48 is that TBU 50 cannot block voltages generated in very poor installations where the protection earthing inductance is so large that the protection earth reference is raised particularly high.

However as previously explained, in the situation where the TBU blocking voltage is nearly exceeded, the MOVs will trigger. Triggering of the MOVs allows excess voltage to be applied to the terminating equipment and damage may occur. It should be noted though that the TBU/MOVs combination will reduce the magnitude of the protection earth generated voltage by very nearly the blocking capacity of TBU 50. This provides a clear advantage over the prior art protection of FIGS. 1 to 3 which does nothing to protect against or mitigate such an event.

Figure 7:
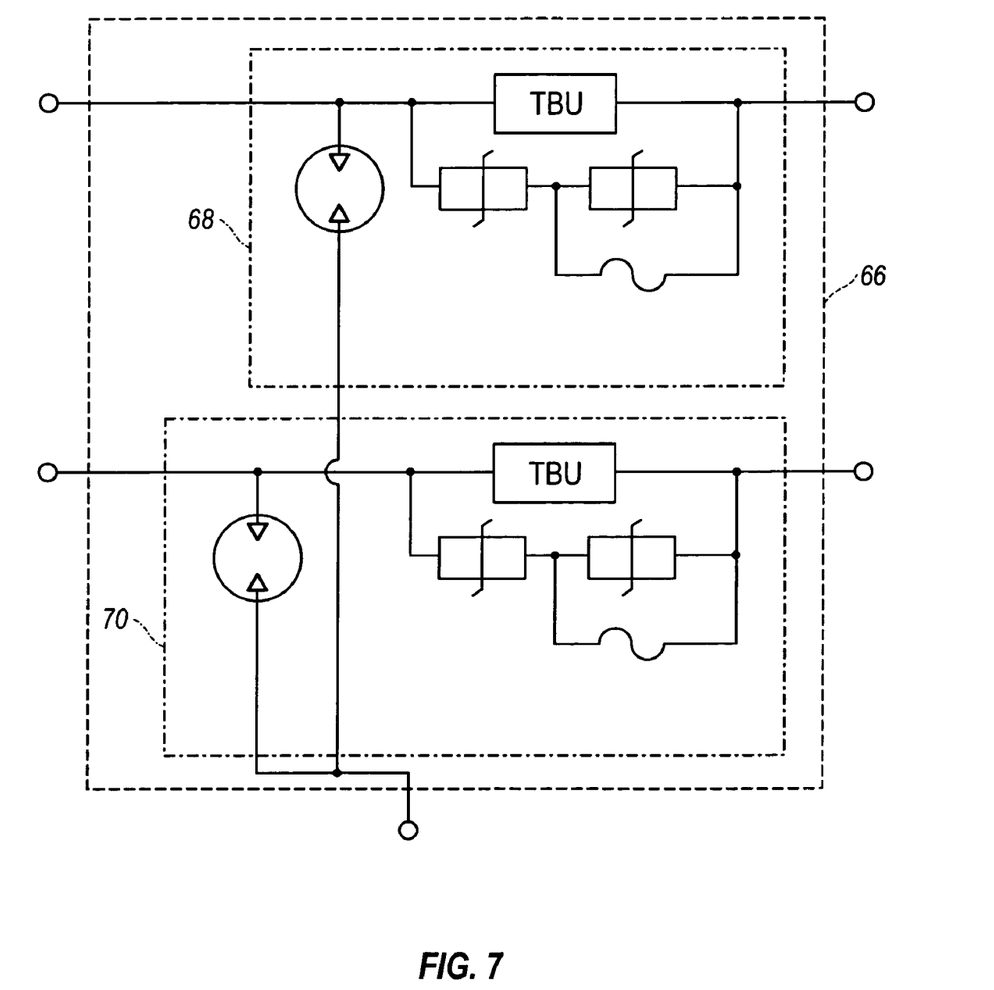
FIG. 7 is a schematic diagram of a protection and indication module according to a further embodiment of the present invention.
Figure 8:
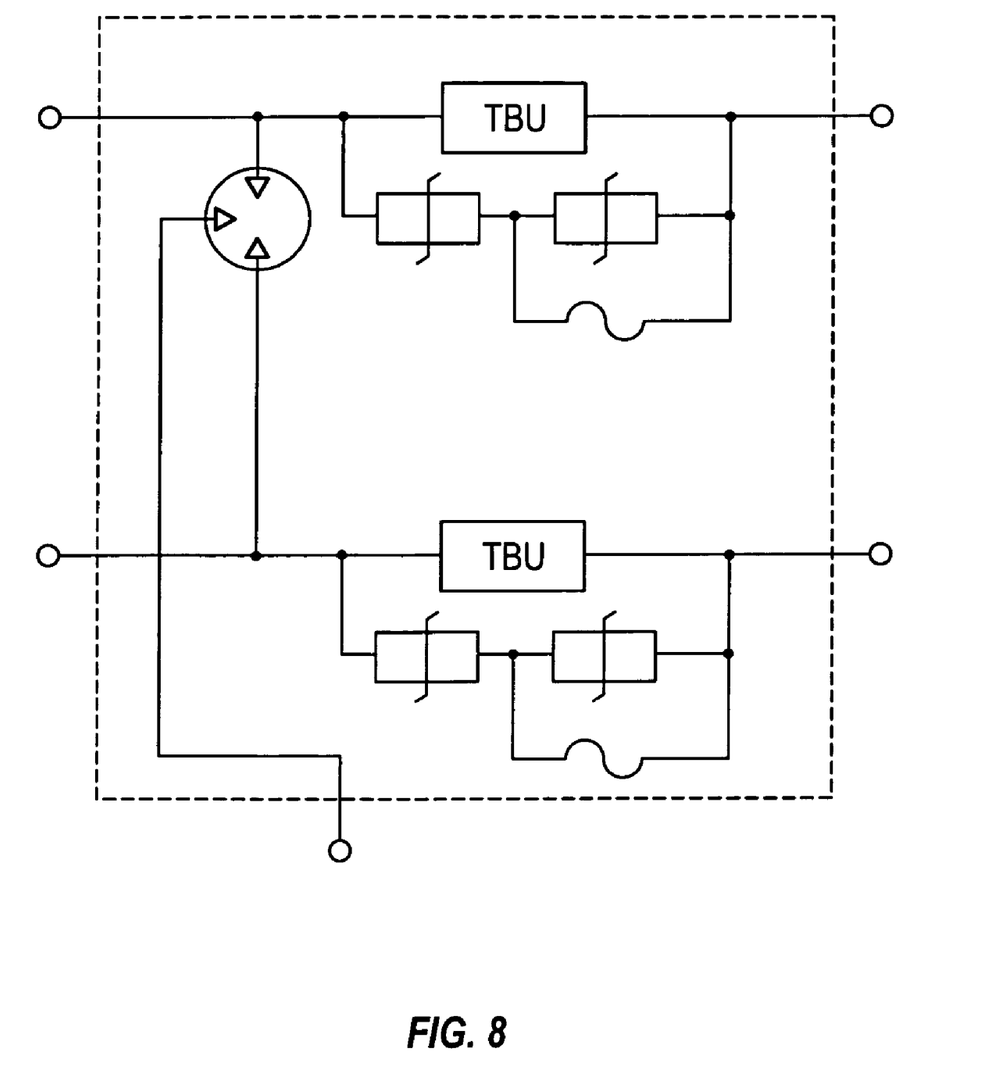
FIG. 8 depicts a variation of the protection and indication module of FIG. 7.

In the preferred embodiment of the invention described with reference to FIGS. 4, 5 and 6 the protection and indication apparatus of those Figures included a single protection circuit composed of GDT 46, TBU 50, MOVs 52 and 56 and fuse 58. Obviously the protection and indication apparatus may be straightforwardly adapted to protect more than one line by adding additional protective circuits. For example, FIG. 7 shows a protection and indication module 66 according to a further embodiment of the present invention specifically designed to protect a pair of lines by means of two protective circuits 68 and 70. In order to minimise the component count, FIG. 8 shows a variation of the module of FIG. 7 wherein a three terminal GDT 72 is used to provide surge arrest for both lines in place of the pair of two-terminal GDTs shown in FIG. 7.

Although the present invention has been described in terms of preferred embodiments, it is not intended that the invention be limited to these embodiments. Equivalent methods, structures, arrangements, processes, steps and other modifications apparent to those skilled in the art will fall within the scope of the following claims.

What is claimed is:

1. A protection apparatus including at least one protection circuit, said protection circuit including an input connection point, an output connection point and an earth reference connection point for protecting electronic equipment connected to said output point from destructive transient voltages at said input point, said circuit further including:
    an electronic isolator arranged to isolate said output connection point in response to said destructive transient voltages;
    a surge arrestor arranged to conduct transient currents associated with said destructive transient voltages to said earth reference connection point; and
    an indicator arranged to indicate the presence of a voltage resulting from an interaction of said transient currents with an earthing impedance;
    wherein said indicator further includes a number of series connected high voltage breakdown devices in parallel with said electronic isolator.

2. An apparatus according to claim 1, wherein said isolator comprises a series protection device between said input connection point and said output connection point.

3. An apparatus according to claim 2, wherein said surge arrestor is connected to a node in common with said input connection point and a side of said series protection device.

4. An apparatus according to claim 3, wherein said indicator includes a fuse.

5. An apparatus according to claim 3, wherein said surge arrestor comprises a gas discharge tube.

6. An apparatus according to claim 1, wherein said indicator includes a fuse.

7. An apparatus according to claim 6, wherein said high voltage breakdown devices comprise metal oxide varistors MOVs.

8. An apparatus according to claim 7 wherein said fuse is connected in parallel across at least one of said series connected MOVs.

9. An apparatus according to claim 1 adapted to provide independent protection for a number of lines.

10. An apparatus according to claim 1, wherein said indicator only activates if said voltage across said electronic isolator exceeds a given threshold, whereby said threshold is above an activation threshold of said surge arrestor.

11. A protection apparatus including at least one protection circuit, said protection circuit including an input connection point, an output connection point and an earth reference connection point for protecting electronic equipment connectable to said output point from destruction transient voltages at said input point, said circuit further including:
- an electronic isolation means for isolating said output connection point from said destructive transient voltages at said input connection point;
- a transient conduction means for conducting transient currents associated with said destruction transient voltages to said earth reference connection point; and
- an indicator means for indicating a presence of a voltage resulting from an interaction of said transient currents with an earthing impedance, wherein said indicator means only activates if a voltage across said electronic isolation means exceeds a given threshold, whereby said threshold is above an activation threshold of said transient conduction means;
- wherein said indicator means further includes a number of series connected high voltage breakdown devices in parallel with said electronic isolation means.

12. An apparatus according to claim 11, wherein said isolation means comprises a series protection means.

13. An apparatus according to claim 11, wherein said transient conduction means comprises a gas arrestor.

14. An apparatus according to claim 11, wherein said indicator means comprises a fuse.

15. An apparatus according to claim 11, wherein said indicator means comprises a circuit breaker.

* * * * *